Figure 1:
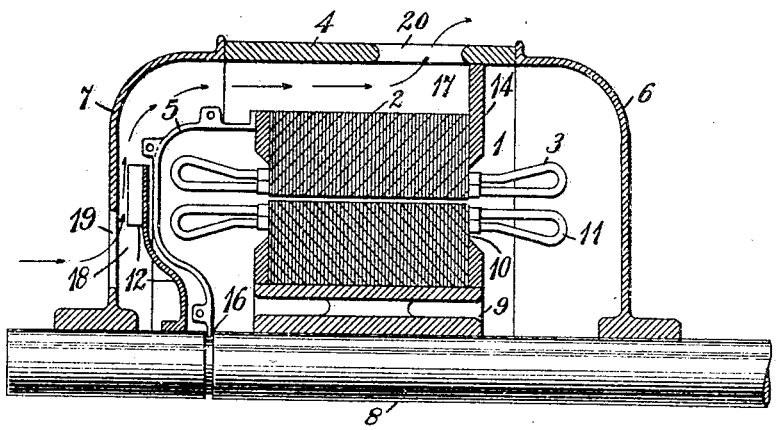

T. HOOCK.
DYNAMO ELECTRIC MACHINE.
APPLICATION FILED JUNE 6, 1911.

1,159,224.

Patented Nov. 2, 1915.
2 SHEETS—SHEET 1.

WITNESSES:
Fred H. Miller

INVENTOR
Theodore Hoock
BY
Wesley E. Carr
ATTORNEY

T. HOOCK.
DYNAMO ELECTRIC MACHINE.
APPLICATION FILED JUNE 6, 1911.

1,159,224.

Patented Nov. 2, 1915.
2 SHEETS—SHEET 2.

WITNESSES:
Fred H. Miller
R. J. Barbour

INVENTOR
Theodor Hoock
BY
Wesley G. Carr
ATTORNEY

UNITED STATES PATENT OFFICE.

THEODORE HOOCK, OF WILKINSBURG, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,159,224.   Specification of Letters Patent.   Patented Nov. 2, 1915.

Application filed June 6, 1911. Serial No. 631,594.

*To all whom it may concern:*

Be it known that I, THEODORE HOOCK, a subject of the Emperor of Germany, and a resident of Wilkinsburg, in the county of Allegheny and State of Pennsylvania, have invented a new and useful Improvement in Dynamo-Electric Machines, of which the following is a specification.

My invention relates to dynamo-electric machines and it has special reference to such machines as are completely inclosed.

One object of my invention is to provide a machine, of the class above indicated, that shall embody means for cooling the windings and core members without exposing any active parts of the machine except the surfaces of the core members which are remote from the windings.

Another object of my invention is to provide a simple and inexpensive stator structure for induction motors and other dynamo-electric machines.

Electric motors and other dynamo-electric machines are frequently employed where it is extremely desirable, if not imperative, that the active parts of the machine be completely inclosed. Motors of this type have usually been more expensive to construct, for a predetermined output, on account of the difficulty of keeping the temperature of the active parts of the machine within permissible limits. In order to overcome this difficulty and permit of the utilization of smaller and cheaper machines for substantially the same service, whether provided with open or partially closed frames or with so-called completely-closed frames, I provide an end bell which completely covers the windings and extends from the outer surface of the core member at one end to the shaft, mount a fan or blower on the shaft outside of the end bell and provide suitable inlet and outlet openings, as hereinafter more fully described.

When stator core members are built up of annular punchings, there is considerable scrap material remaining, since the sheet iron or steel plates from which they are cut are square or rectangular in form. Furthermore, it is necessary to provide the cylindrical frame of the machine with ribs or other internal projections in order to permit a circulation of air across the outer surface of the core member. By utilizing substantially square plates or punchings, I increase the magnetically active portion of the core and reduce the amount of scrap material and also make it possible to use a hollow cylindrical frame having a smooth bore and yet expose a large proportion of the external surface of the core to ventilation.

Figure 2:
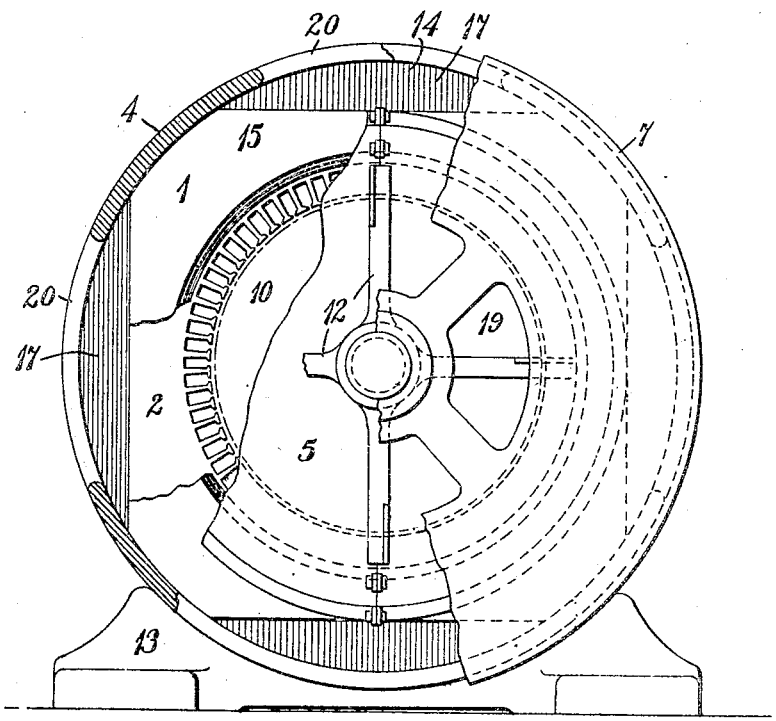
Figure 3:
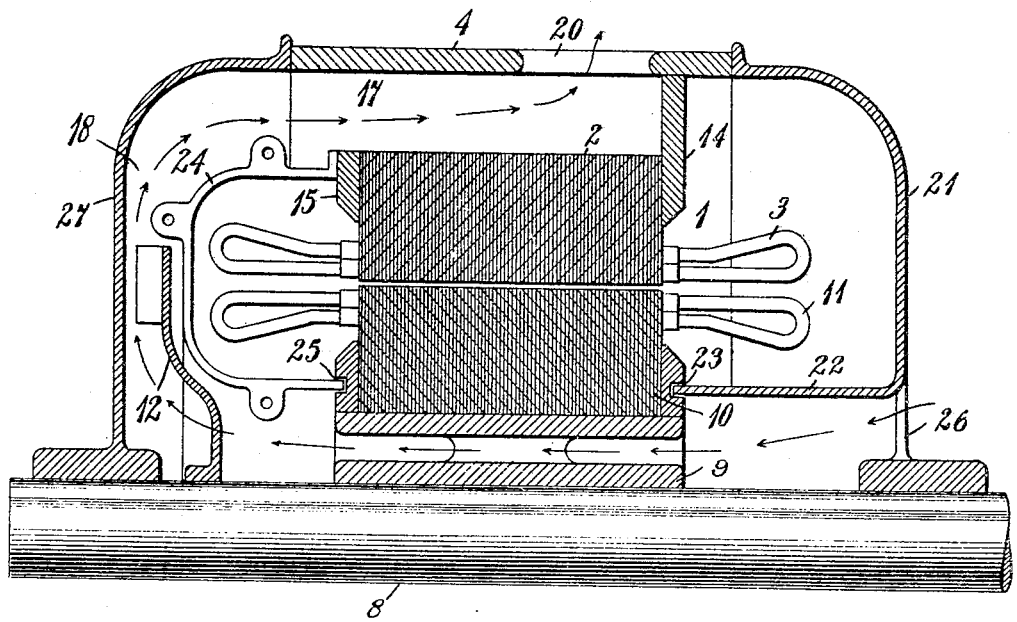

Figure 1 of the accompanying drawings is a sectional elevation showing a portion of a dynamo-electric machine constructed and arranged in accordance with my invention. Fig. 2 is an end view of the motor shown in Fig. 1, certain of the parts being broken away to more completely illustrate the invention. Fig. 3 is a view corresponding to Fig. 1, but on a larger scale, of a modified arrangement embodying my invention.

Referring to Figs. 1 and 2 of the drawings, the machine here shown consists of a stator 1 comprising a stationary core member 2, a winding 3, a supporting frame 4, an end bell 5 and end frames 6 and 7, and a rotor comprising a shaft 8, a spider 9 mounted thereon, a substantially cylindrical core member 10, a winding 11 and a fan 12. The stationary supporting frame 4 is provided with a removable base structure 13 and the core member 2 is built up of a plurality of substantially square punchings or laminæ, the corners of which are rounded to fit into the hollow cylindrical frame 4. The laminæ or punchings are disposed between plates 14 and 15, the periphery of the plate 14 being circular to fit into the frame 4, while the plate 15 corresponds in form to the laminæ. The plate 14 and the end frame 6 in which no openings are provided, are located at the same end of the frame 4 and, consequently, this end of the machine is completely inclosed and is cut off from the rest of the machine except through the air gap existing between the core members 2 and 10. Since no openings are provided in the end bell 5, which extends from a groove 16 in the shaft 8, to the end plate 15, all of the active parts of the motor, except for the outer surface of the core member 2, are completely inclosed between the said end bell and the end frame 6, at the opposite end of the machine. As shown in Fig. 2 of the drawings, the difference in shape between the frame 4 and the core member 2 provides a plurality of passages 17, although similar openings may be otherwise provided, and there is sufficient difference in size between the end frame 7 and the bell 5 to establish communication from a chamber 18, in which the fan 12 operates, to the passages 17. The end frame 7 is provided with inlet openings 19 near the shaft 8, and the frame 4 is provided with outlet openings 20 near the plate 14 which constitutes a partition. When the machine is in operation, the shaft and the fan 12 produce a circulation of air through the openings 19, the chamber 18, the passages 17 and the outlets 20. The air thus supplied to the outer surface of the core member materially lowers the temperature of the whole machine and enables a machine of a given size and cost to deliver a larger amount of energy.

The structure may be modified, as shown in Fig. 3, to expose the inner surface of the rotor 4 as well as the outer surface of the stator core. The end frame 21, corresponding to the frame 6 of Fig. 1, is provided with an annular, inwardly extending projection 22 which extends into a groove 23 in the rotor, and the end bell 24, which corresponds to the end bell 5 of Fig. 1, is formed to engage a groove 25 in the rotor instead of a groove 16 in the shaft 8. Both ends of the core members 2 and 10 and the windings are consequently entirely inclosed. The end member 21 is provided with inlet openings 26 near the shaft 8, but no openings are provided in the end member 27, which corresponds to the end member 7 of Fig. 1. When the rotor and the fan 12 are rotated, a circulation of air is established through the inlets 26 around the shaft, through the spider 9, outwardly through the chamber 18 and passages 17 to the outlets 20.

The structure shown in Fig. 3 permits a somewhat more complete cooling of the machine than is provided by the arrangement shown in Fig. 1, since the surfaces of both core members of the machine which are remote from the windings are exposed to the air currents.

Structural modifications may be effected within the spirit and scope of my invention, and I desire that only such limitations shall be imposed as are indicated in the appended claims.

I claim as my invention:

1. A dynamo-electric machine comprising a stationary frame having a plurality of outlet openings, a core member supported therein and so shaped as to provide chambers communicating with the outlet openings, a closed end frame at one end and an open end frame at the other end of the supporting frame, an end bell within the open frame providing a chamber which communicates with the first named chambers, a partition separating the space within the closed end frame from the communicating chambers, and a fan located in one of the chambers to provide a circulation of air into the open end frame and out of the supporting frame.

2. A dynamo-electric machine comprising a stationary core member and windings therefor, a movable core member and windings associated therewith, a stationary frame for supporting the stationary core member, means coöperating with the same to entirely inclose one end of the core members and windings, and means independent of the frame for inclosing the opposite end of the core members and windings.

3. A dynamo-electric machine comprising a stationary core member and windings therefor, a movable core member and windings associated therewith, a stationary frame for supporting the stationary core member, an end plate and a closed end frame for inclosing one end of the core members and windings, an open end frame at the opposite end of the stationary frame, and independent means for inclosing the core members and windings within the open end frame.

4. A dynamo-electric machine comprising a stationary frame having a plurality of outlet openings, a core member supported therein and so shaped as to provide chambers communicating with the outlet openings, a closed end frame at one end and an open end frame at the other end of the supporting frame, an end bell within the open frame providing a chamber which communicates with the first named chambers, and a partition separating the space within the closed end frame from the communicating chambers.

In testimony whereof, I have hereunto subscribed my name this 25th day of May, 1911.

THEODORE HOOCK.

Witnesses:
OTTO S. SCHAIRER,
B. B. HINES.